United States Patent [19]

Carey et al.

[11] Patent Number: 5,500,133
[45] Date of Patent: Mar. 19, 1996

[54] POLYMERIC DITHIOCARBAMATE ACID SALT COMPOSITIONS AND METHOD OF USE

[75] Inventors: William S. Carey, Ridley Park; Ellen M. Meyer, Doylestown, both of Pa.

[73] Assignee: Betz Laboratories, Inc., Trevose, Pa.

[21] Appl. No.: 390,341

[22] Filed: Feb. 17, 1995

[51] Int. Cl.⁶ .................................................... C02F 1/62
[52] U.S. Cl. .................. 210/729; 210/735; 210/911; 210/912
[58] Field of Search ...................... 210/732, 735, 210/736, 911, 912, 913, 914, 729

[56] References Cited

U.S. PATENT DOCUMENTS

| | | | |
|---|---|---|---|
| 2,326,643 | 8/1943 | Hester | 260/125 |
| 2,609,389 | 9/1952 | Flenner | 260/500 |
| 2,693,485 | 11/1954 | Gobeil | 260/500 |
| 4,578,195 | 3/1986 | Moore et al. | 210/911 |
| 4,670,160 | 6/1987 | Moriya et al. | 210/728 |
| 4,670,180 | 6/1987 | Moriya et al. | 252/180 |
| 4,689,177 | 8/1987 | Thompson et al. | 252/344 |
| 4,731,187 | 3/1988 | Moriya et al. | 210/719 |
| 4,826,625 | 5/1989 | Thompson et al. | 252/344 |
| 4,855,060 | 8/1989 | Durham et al. | 210/708 |
| 4,864,075 | 9/1989 | Thompson et al. | 558/237 |
| 4,956,099 | 9/1990 | Thompson et al. | 210/764 |
| 5,006,274 | 4/1991 | Durham et al. | 252/180 |
| 5,013,451 | 5/1991 | Thompson et al. | 210/708 |
| 5,019,274 | 5/1991 | Thompson et al. | 210/729 |
| 5,026,483 | 6/1991 | Thompson et al. | 210/708 |
| 5,089,227 | 2/1992 | Thompson et al. | 422/16 |
| 5,089,619 | 2/1992 | Thompson et al. | 544/357 |
| 5,152,927 | 10/1992 | Rivers | 252/344 |
| 5,164,095 | 11/1992 | Sparapany et al. | 210/735 |
| 5,205,939 | 4/1993 | Syrinek | 210/912 |
| 5,302,296 | 4/1994 | Evarn et al. | 210/728 |
| 5,347,071 | 9/1994 | Moriya et al. | 210/728 |
| 5,372,726 | 12/1994 | Straten | 210/728 |
| 5,387,365 | 2/1995 | Moriya et al. | 252/180 |

OTHER PUBLICATIONS

"Synthesis and Photochemical Reactions of Polymers Containing Dithio-carbamate and Xanthate Groups and Their Model Compounds", M. Okawara, et al., *Bull. Tokyo Inst. Technol.*, No. 78, 1–16, (1966), CAS (68: 78, 731n).
"Poly[n-(dithiocarboxylate)iminoethylenehydrogen-iminoethylene] A Novel Metal–Complexing Polymer", J. H. Barnes et al., *Die Makromolekulare Chemie*, 177, 307–310 (1976).
"Synthesis of Dithiocarbamates From Linear Poly(iminoehtylene) and Some Model compounds", Ivin et al., *Makromol. Chem.*, 179, 591–599(1978).
"Heavy Metal Removal from Wastewater", Miyoshi Oil and Fat Co., Ltd., 13 Jun. 1981, 7 pp., CAS (98:185066r).
"Metal Scavengers for Wastewater Treatment", Moriya et al., 20 Dec. 1989, 12 pp., CAS (115:119534k).
"Metal–Capturing Agents and Capture of the Metals", Moriya et al., 30 Jun. 1992, 10 pp. CAS (121:116837z).
"Waste Water–Treating Agents", Tomita, et al., 12 Jul. 1973, 5 pp., CAS (83:151870y).
Contemporary Polymer Chemistry, H. R. Allcock and F. W. Lampe, Chap. 11, pp. 245–267, 1981.

*Primary Examiner*—Neil McCarthy
*Attorney, Agent, or Firm*—Alexander D. Ricci; Matthew W. Smith

[57] ABSTRACT

A contaminant precipitating composition and method are disclosed. The composition comprises a water soluble, branched, polydithiocarbamic acid salt effective for the purpose of precipitating contaminants from an aqueous solution. The method comprises adding an amount of the composition effective for the purpose to the aqueous solution so as to complex, precipitate and remove contaminants from the aqueous solution.

11 Claims, 2 Drawing Sheets

POLYMERIC DITHIOCARBAMATE ACID SALT COMPOSITIONS AND METHOD OF USE

FIELD OF THE INVENTION

The present invention relates to multipurpose, water soluble, polydithiocarbamic acid salts. More particularly, the present invention relates to the use of branched, water soluble polydithiocarbamic acid salts to precipitate contaminants from aqueous solutions.

BACKGROUND OF THE INVENTION

Industry has come under strict regulations to limit the level of contaminants in discharged wastewater as a result of problems caused by the contamination of waterways. Particularly restrictive discharge regulations have been adopted for contaminants harmful to humans and aquatic organisms such as heavy metals; for example, copper, lead, zinc, cadmium and nickel, and certain non-metals such as arsenic and selenium. Consequently, a number of processes have been proposed to reduce the heavy metal content of wastewater to meet increasingly stringent discharge limits.

One common practice is to precipitate the bulk of the heavy metal contaminant as its metal hydroxide. Metal ions such as Cu and Pb are easily precipitated in this way, but the minimum concentration that can be obtained is limited by the finite solubility of the hydroxide complexes. The resulting effluent from the hydroxide precipitation may be treated with a metal scavenging agent to remove any trace metal contaminants to meet discharge regulations. These agents may be precipitants, adsorbents, or metal specific ion exchange resins. The metal scavenger precipitants may also be effective when added in the same step as the hydroxide precipitation. Typical compounds utilized as precipitating scavenging agents include sulfides, (thio)carbonates, alkyl dithiocarbamates, mercaptans, and modified natural products.

Non-metals such as selenium and arsenic are not easily precipitated with hydroxide. These ions are typically co-precipitated with metal salts such as ferric sulfate. Traditional precipitant metal scavenging agents are usually ineffective in removing these ions.

The known metal scavenging agents have other limitations. The metal thiocarbonates, sulfides, mercaptans, and thiocarbamates form a fine floc which is not conducive to settling and typically require the use of a flocculation agent and/or filtration to achieve efficient removal. Known polydithiocarbamates are characterized as having limited water solubility, which limits the degree of functionalization possible. In addition, a number of the scavenging agents are themselves very toxic and care must be taken to ensure that they are not present in the discharged wastewater.

Therefore a need exists for a less toxic metal scavenging agent that forms larger, faster settling floc than the known compounds. It is also desirable that this material be water soluble so it can be utilized in existing clarification facilities, avoiding the need for capital investment in resin-bed apparati or other specialized equipment.

Accordingly, it is an object of this invention to provide a branched water soluble polymeric composition for precipitating contaminants from aqueous solutions and a method for using the composition.

PRIOR ART

The preparation of dithiocarbamic acids by the reaction of carbon disulfide with amines is well documented. For example, U.S. Pat. Nos. 2,609,389 and 2,693,485 disclose the reaction products of lower alkylene diamines with carbon disulfide to yield the corresponding dithiocarbamic acids or their salts. In some of the literature these products are referred to as polydithiocarbamates because each molecule contains more than one dithiocarbamate functionality. For the purpose of our invention, however, a polydithiocarbamate is defined as having at least ten distinct monomer units containing a dithiocarbamate functionality (i.e., the sum of n of Formula 1 is >10).

U.S. Pat. Nos. 4,855,060, 5,006,274 and 5,152,927 disclose the use of di- and trifunctional dithiocarbamate compounds as water clarification agents.

Monofunctional sodium dialkyldithiocarbamates are marketed by ALCO Chemical Corporation (AQUAMET®E, AQUAMET®M) and Vinings Industries, Inc. (VINMET® 1140) as heavy metal precipitants for wastewater treatment applications.

U.S. Pat. Nos. 4,689,177, 4,826,625, 4,864,075, 4,956,099, 5,013,451, 5,019,274, 5,026,483, 5,089,227 and 5,089,619 disclose the use of mainly di- and trifunctional dithiocarbamates as demulsifiers, clarification agents, biocides, corrosion and scale inhibitors, and flocculants in wastewater treatment applications. The preparation of the pentafunctional dithiocarbamate derivative of tetraethylenepentamine (TEPA) is also disclosed.

U.S. Pat. Nos. 4,670,160 and 4,670,180 disclose the functionalization of reaction products of polyamines and epichlorohydrin with carbon disulfide to yield carbamates containing metal scavenger compounds. Combined use of the metal scavenging compound with at least one sodium monosulfide, sodium polysulfide and sodium hydrogen sulfide resulted in a synergistic effect in the precipitation of heavy metals from a wastewater. Both patents disclose that the metal scavenger of the invention has a linear structure and generally shows water-solubility when the polyamine polycondensed with the epihalohydrin is a diamine with two amino groups. The patents also disclose that when the metal scavenger has a crosslinked structure it forms either dispersion or suspension upon its mixing with water.

U.S. Pat. No. 4,731,187 discloses a synergistic combination of a metal scavenging compound with at least one sodium monosulfide, sodium polysulfide and sodium hydrogen sulfide for use in the precipitation of heavy metals from a wastewater. The patent also discloses that the metal scavenger can be prepared by functionalization of polyethyleneimine with carbon disulfide to yield a polymeric dithiocarbamate. In each case the resulting polydithiocarbamate was water insoluble.

U.S. Pat. No. 5,164,095 discloses the functionalization of ethylene dichloride/ammonia polymers with carbon disulfide to yield water soluble polydithiocarbamates effective as heavy metal precipitants in treating wastewater. The patent also discloses that as the molecular weight of the polyamine increases, the amount of carbon disulfide which can be reacted to form a water soluble product decreases. The upper molecular weight is limited to 100,000, and the degree of functionalization is limited to 5 to 50 mole percent carbon disulfide.

SUMMARY OF THE INVENTION

The present invention is a composition and method of using the composition to precipitate contaminants from an aqueous solution. The composition is a water soluble branched polydithiocarbamic acid salt having the formula:

wherein $R^1$ is independently an organic radical or wherein $R^4$ is independently an organic radical and x=1 to 5; $R^2$ is independently —H or —$CS_2R^5$; $R^5$ is independently H or a cation; $R^3$ is N or a substituted organic radical; Z is independently N—$R^2$, O or S; the sum of n is an integer greater than 10; and m is an integer greater than 2.

The method of using the composition to precipitate contaminants from an aqueous solution comprises adding to the aqueous solution an amount effective for the purpose of a complexing composition. The complexing composition, comprising the water soluble branched polydithiocarbamic acid salt, complexes with the contaminants in the aqueous solutions and precipitates out of the solution thereby removing contaminants from the aqueous solution.

BRIEF DESCRIPTION OF THE DRAWINGS

The accompanying drawings, which are incorporated in and form a part of the specification, illustrate the embodiments of the present invention and, together with description, serve to explain the principles of the invention. In the drawings.

DETAILED DESCRIPTION OF THE PREFERRED EMBODIMENTS

The present invention provides water soluble compositions and a method for using the compositions for precipitating contaminants from aqueous solutions.

The branched water soluble compositions of this invention are formed by first reaction of epihalohydrin with a mixture of primarily an amine compound consisting of at least two primary amine functional groups such as ethylenediamine, and an amine compound consisting of three primary amine functional groups such as tris(2-aminoethyl)amine, then functionalization with carbon disulfide. The general structure of the resulting polydithiocarbamic acid salts are represented by the following formula:

Formula I wherein $R^1$ independently represents an organic radical which may be the same or different for each representation of $R^1$, or:

wherein $R^4$ independently represents an organic radical which may be the same or different for each representation of $R^4$ and x=1 to 5; $R^2$ independently represents —H or —$CS_2R^5$ which may be the same or different for each representation of $R^2$ and $R^5$ each independently represents H or a cation which may be the same or different for each representation of $R^5$; $R^3$ represents N or a substituted organic radical; Z represents N—$R^2$, O, or S which may be the same or different for each representation of Z; the sum of n is an integer greater than 10; and m is an integer greater than 2.

In a preferred embodiment of the invention, $R^1$ is an ethylene radical, the sum of n is greater than 10, m=3, $R^3$=N, >50% of $R^2$ are —$CS_2R^5$, $R^5$ is an alkali metal and Z is N—$R^2$.

In a particularly preferred embodiment of the invention, $R^1$ is an ethylene radical, the sum of n is greater than 25, m=3, $R^3$=N, >50% of $R^2$ are —$CS_2R^5$, $R^5$ is an alkali metal and Z is N—$R^2$.

In another particularly preferred embodiment of the invention, $R^1$ is an ethylene radical, the sum of n is greater than 25, m=3, $R^3$=N, >79% of $R^2$ are —$CS_2R^5$, $R^5$ is an alkali metal and Z is N—$R^2$.

The water soluble compounds of the present invention can be prepared by reacting a polyamine, consisting of mainly secondary amine functionality, with carbon disulfide in an aqueous solution. The polyamine of this invention generally has a branched structure as a result of addition of crosslinking compounds during its manufacturing.

In a preferred embodiment of the invention, aqueous solutions of the present invention are prepared by first reacting a mixture of primarily an amine compound consisting of at least two primary amine functional groups, and an amine compound consisting of three primary amine functional groups, with an epihalohydrin to yield a branched water soluble polyamine consisting of mainly secondary amine functionality. The synthesis is conducted by methods known to those skilled in the art to prevent gelation of the polyamine compound. For a general review of methods to control the molecular weight and branching of the polymeric compounds, see Allcock et al., "Contemporary Polymer Chemistry", Chapter 11, Prentice-Hall, Inc., N.J., 1981. Compounds suitable for preparing the polyamine compositions of the present invention are well known to those skilled in the art. Representative compounds consisting of at least two primary amine functional groups include, but are not limited to, ethylenediamine (EDA), propylenediamine, diethylenetriamine (DETA), tripropylenetetramine, 1,3-diamino-2-hydroxypropane, bis(hexamethylenetriamine) (BHMT), Jeffamine® polyoxyalkyleneamines commercially available from Texaco, triethylenetetramine (TETA), tetraethylenepentamine (TEPA), and polyethyleneimine. Representative crosslinking compounds consisting of at least three primary amine functional groups include, but are not limited to, melamine or tris(2-aminoethyl)amine (TREN). It is also considered part of this invention that non-amine compounds such as, but not limited to, glycerol, pyrogallol, and pentaerythritol can also be utilized as the branching agent.

The polyamine synthesis is typically conducted under atmospheric conditions initially at about 30° C. to 70° C. utilizing a substoichiometric amount of epihalohydrin as determined by the method of Allcock et al. The mixture is then heated to about 70° C. to 100° C. and additional epihalohydrin is charged until the desired molecular weight is achieved, typically determined by monitoring the viscosity of the system. The polyamine product is then reacted with carbon disulfide to produce dithiocarbamic acid salts.

Methods for the reaction of amines with carbon disulfide to prepare dithiocarbamic acid salts are well known and are detailed in U.S. Pat. Nos. 2,609,389, 2,693,485 and 5,013,451.

The molecular weight of the polydithiocarbamic acid salt may be less than the initial starting polyamine precursor due to side reactions such as Hoffman-type elimination. This degradation is acceptable as long as n in Formula 1 of resulting product is greater than ten repeat units. The reaction conditions utilized for the dithiocarbonylation of the polyamine precursor can also be modified by methods known to those skilled in the art to minimize degradation of the polymer.

It will be appreciated that by-products (for example inorganic salts) are coproduced along with the compounds of the present invention in the course of the above reaction scheme. The desired reaction product can be readily separated from the reaction by-products by known methods. However, it is feasible and economical to employ the present compounds as produced without separation or purification.

The compounds of the present invention can be added to an aqueous system for which precipitation of metal contaminants such as transition metals, post-transition metals, lanthanides, actinides, and non-metal contaminants such as arsenic, selenium, and tellurium is desired, in an amount effective for the purpose. This amount will vary depending on the particular system for which treatment is desired and will be influenced mainly by the metal content of the water and the presence of other ligand and chelant molecules. Treatment levels of composition in an aqueous solution can be from about 0.1 parts per million (ppm) to about 10,000 ppm, preferably from about 0.1 ppm to about 1,000 ppm and most preferably from about 0.1 ppm to about 500 ppm. The metal polymer complexes formed are self flocculating, quick settling, and readily separated from the aqueous solution. Anticipated uses of the invention compositions include but are not limited to contaminant removal from incinerator scrubber water, cooling tower blowdown and wastewaters resulting from mining, metal finishing and other industrial operations. The compositions of the present invention are also expected to exhibit water clarification activity in aqueous systems which contain an oil-in-water emulsion.

The invention will now be further described with reference to a number of specific examples which are to be regarded solely as illustrative and not restricting the scope of the present invention.

EXAMPLE 1

A suitable reactor vessel was equipped with a mechanical stirrer, thermometer, condenser, nitrogen sparge, caustic scrubber, and addition ports. Ethylenediamine (EDA, 99%, 54.64 g, 0.90 mole), tris(aminoethyl) amine (TREN, 97%, 15.08 g, 0.10 mole), and 103 ml of deionized water were charged to the vessel and sparged with nitrogen. The batch temperature was adjusted to 40° C., then epichlorohydrin (ECH, 99%, 100.75 g, 1.078 mole) was charged dropwise over a 3 hour period. After addition, the batch was held at 40° C. for 3 hours, then was allowed to sit overnight without heating or mixing. The batch was then heated to 90° C. and an additional amount of ECH (99%, 11.32 g, 0.12 mole) was charged shotwise in 11 equal portions over an approximately 6.5 hour period with mixing. Aqueous sodium hydroxide (50%, 71.56 g, 0.896 mole) was added to the batch at two hours into the ECH shot procedure. After completion of the ECH shots, the batch was held for 0.5 hours at 90° C., then was allowed to mix overnight without heating. The next day aqueous sodium hydroxide (50%, 24.28 g, 0.304 mole) and 72 ml of deionized water were charged to the batch with mixing at a batch temperature below 30° C. The resulting viscous, clear, yellow-tinted liquid was adjusted to 453.17 g with deionized water to yield a 30% by weight solution of terpoly[DETNTREN/ECH] as the free base. The viscosity of the solution, referred to as Terpolymer I, was 666 cps (centipoise) at 25° C.

Two additional terpoly[DETAfTREN/ECH] samples were prepared in a similar fashion. A summary of the polyamine compounds is shown in Table I.

TABLE I

| Terpoly[EDA/TREN/ECH] Sample Summary | | | | | |
|---|---|---|---|---|---|
| Example | EDA:TREN[1] | % Solids | % Actives[2] | pH[3] | Viscosity[4] |
| Terpolymer 1 | 9:1 | 45.0 | 30.0 | 13.99 | 666 cps |
| Terpolymer 2 | 9:1 | 38.7 | 26.0 | 12.94 | 1,790 cps |
| Terpolymer 3 | 19:1 | 40.9 | 26.0 | 12.75 | 3,592 cps |

[1] Mole ratio EDA:TREN
[2] As the free base polymer
[3] pH 10.0 buffer, at 25° C.
[4] Measured at 25° C.

EXAMPLE 2

To a reactor set-up similar to that described in Example 1 was charged Terpolymer I (125.76 g). The polymer solution, sparged with $N_2$, was cooled with an ice water bath, then aqueous sodium hydroxide (50%, 20 g, 0.25 mole) was charged to the vessel. The $N_2$ sparge was then switched to a nitrogen blanket and carbon disulfide (19.04 g, 0.25 mole) was charged dropwise over a 15 minute period with ice water cooling. After addition, the batch was mixed 1 hour with cooling, then was allowed to gradually warm to room temperature. Any residual carbon disulfide was then removed from the product by sparging with nitrogen. The resulting solution was adjusted to 249.06 g with deionized water to yield a 25% by weight actives product. The viscosity of the solution, referred to as Composition 2, was 44.6 centipoise (cps) at 25° C.

The polymers of Example 1 were functionalized with various amounts of carbon disulfide in a similar manner. A summary of the compounds prepared for testing is shown in Table II.

TABLE II

Polymeric Dithiocarbamic Acid Salt Summary

| Composition Number | Terpolymer | Mole % $CS_2$[1] | % Actives[2] | Viscosity[3] | Sum of n[4] |
|---|---|---|---|---|---|
| Composition 1 | Terpolymer 1 | 80 | 25 | 18.0 | 173 |
| Composition 2 | Terpolymer 1 | 50 | 25 | 44.6 | 483 |
| Composition 3 | Terpolymer 2 | 80 | 25 | 36.5 | * |
| Composition 4 | Terpolymer 2 | 50 | 25 | 85.7 | * |
| Composition 5 | Terpolymer 3 | 80 | 25 | 49.0 | * |
| Composition 6 | Terpolymer 3 | 50 | 25 | 119.6 | * |

[1] Mole % $CS_2$ charged relative to the theoretical moles of reactive secondary amines. Secondary amines equivalent to twice the amount of ECH in excess of the moles of amines charged, and tertiary amines, were not considered reactive.
[2] Excludes solids associated with by-product salt (i.e., NaCl) formation.
[3] Centipoise measured at 25° C.
[4] Sum of n as determiend by Low Angle Laser Light Scattering (LALLS)
*Not determined.

EXAMPLE 3

Two synthetic wastewaters described in Table III were treated with varying dosages of the compositions set forth in Table II. These tests were conducted referenced to sodium dimethyldithiocarbamate (DMDTC), commercially available from Vinings Industries under the tradename VINMET® 1140, and from ALCO Chemical Corporation under the trade name AQUAMET®M, and a blend of polymeric dithiocarbamate, sodium hydrosulfide, sodium chloride, and disodium ethylenebis (dithiocarhamate), marketed by CYTEC Industries, E-2863. The dosages of the compositions, in units of parts per million of actives, were each added to a 200 ml aliquot of the synthetic wastewater (pH=9.0) while mixing at 100 revolutions per minute (rpm). The combinations were then mixed for 2 minutes at 100 rpm and 5 minutes at 35 rpm. During the fast mixing stage (100 rpm) small floc were formed as the metal-polymer complexes formed. During the slow mixing stage (35 rpm) the floc grew in size. When the contents of the jars were allowed to settle for 5 minutes, the large heavy floc rapidly settled out of solution. The supernatant was then withdrawn from the mixture, one half of which was filtered through a 5 micron filter. Both the filtered and unfiltered samples were then digested with 5% HCl at 90°–95° C. for four hours before analysis for metal content using inductively coupled plasma atomic emission spectroscopy (ICP-AES). The untreated wastewater was also analyzed by ICP-AES for reference. The untreated synthetic wastewater analysis is shown in Table III.

The supernatant metal analyses for the filtered and unfiltered results are shown in Tables IVA and IVB.

TABLE III

Synthetic Wastewater Analysis

| Sample 1 | Untreated Sample 1 (ppm) | Untreated Sample 2 (ppm) |
|---|---|---|
| Al | 1.90 | 2.10 |
| Sb | 2.50 | <0.050000 |
| As | 1.76 | 2.00 |
| Cd | 1.77 | 1.70 |
| Ca, $AsCaCO_3$ | 5.25 | 0.06000 |
| Cr, $AsCrO_4$ | 3.99 | 4.30 |
| Co | 1.77 | 2.00 |
| Cu | 1.84 | 2.02 |
| Fe | 2.08 | <0.00300 |
| Pb | 1.90 | 2.10 |
| Mg, $AsCaCO_3$ | 7.59 | 7.91 |

TABLE III-continued

Synthetic Wastewater Analysis

| Sample 1 | Untreated Sample 1 (ppm) | Untreated Sample 2 (ppm) |
|---|---|---|
| Mn | 1.86 | <0.00100 |
| Mo, $AsMoO_4$ | 3.56 | 3.40 |
| Ni | 1.80 | 2.10 |
| Se | 1.91 | 2.00 |
| Ag | 0.430 | 0.450 |
| Sr | 1.87 | 2.01 |
| Ti | 1.84 | 2.02 |
| V | 1.81 | 2.02 |
| Zn | 1.89 | 2.07 |
| Ar | 1.82 | |
| Tl | | 2.00 |

TABLE IVA

Synthetic Wastewater - Unfiltered Supernatant Analysis

| Sample 1 | DMDTC 2 ppm | DMDTC 20 ppm | DMDTC 100 ppm |
|---|---|---|---|
| Al | 1.60 | 0.500 | 0.900 |
| Sb | 2.30 | 1.00 | 2.00 |
| As | 1.44 | 0.266 | 0.571 |
| Cd | 1.41 | 0.150 | 0.310 |
| Ca, $AsCaCO_3$ | 5.16 | 4.51 | 4.32 |
| Cr, $AsCrO_4$ | 3.18 | 0.330 | 1.10 |
| Co | 1.49 | 0.370 | 0.160 |
| Cu | 1.49 | 0.190 | 0.400 |
| Fe | 1.66 | 0.160 | 0.550 |
| Pb | 1.50 | 0.200 | 0.500 |
| Mg, $AsCaCO_3$ | 7.41 | 6.92 | 6.59 |
| Mn | 1.66 | 0.780 | 0.890 |
| Mo, $AsMoO_4$ | 3.43 | 2.98 | 3.08 |
| Ni | 1.50 | 0.300 | 0.450 |
| Se | 1.69 | 1.10 | 0.259 |
| Ag | 0.330 | 0.04000 | 0.08000 |
| Sr | 1.79 | 1.53 | 1.46 |
| Ti | 1.48 | 0.120 | 0.440 |
| V | 1.52 | 0.520 | 0.780 |
| Zn | 1.50 | 0.230 | 0.700 |
| Zr | 1.52 | 0.440 | 0.710 |

| Sample 1 | Composition 1 2 ppm | Composition 1 20 ppm | Composition 1 100 ppm |
|---|---|---|---|
| Al | 0.600 | 0.300 | 1.70 |
| Sb | 2.00 | 1.00 | 2.40 |
| As | 0.535 | 0.266 | 1.61 |

TABLE IVA-continued

Synthetic Wastewater - Unfiltered Supernatant Analysis

| | | | |
|---|---|---|---|
| Cd | 0.490 | 0.120 | 1.62 |
| Ca, AsCaCO₃ | 4.44 | 4.06 | 4.62 |
| Cr, AsCrO₄ | 0.300 | 0.220 | 3.47 |
| Co | 0.620 | 0.150 | 0.660 |
| Cu | 0.680 | 0.140 | 0.890 |
| Fe | 0.490 | 0.110 | 1.86 |
| Pb | 0.580 | 0.200 | 1.70 |
| Mg, AsCaCO₃ | 7.15 | 6.85 | 7.03 |
| Mn | 1.09 | 0.560 | 1.65 |
| Mo, AsMoO₄ | 3.07 | 2.93 | 3.22 |
| Ni | 0.670 | 0.200 | 1.60 |
| Se | 1.30 | 1.18 | 0.06000 |
| Ag | 0.200 | 0.03000 | <0.00500 |
| Sr | 1.67 | 1.52 | 1.72 |
| Ti | 0.430 | 0.100 | 1.67 |
| V | 0.680 | 0.440 | 1.62 |
| Zn | 0.500 | 0.160 | 1.71 |
| Zr | 0.660 | 0.390 | 1.64 |

| Sample 1 | Composition 2 2 ppm | Composition 2 20 ppm | Composition 2 100 ppm |
|---|---|---|---|
| Al | 0.800 | 0.400 | 1.00 |
| Sb | 2.00 | 1.00 | 2.00 |
| As | 0.761 | 0.340 | 0.811 |
| Cd | 0.730 | 0.210 | 0.700 |
| Ca, AsCaCO₃ | 4.51 | 4.26 | 3.68 |
| Cr, AsCrO₄ | 1.50 | 0.410 | 1.50 |
| Co | 0.810 | 0.260 | 0.380 |
| Cu | 0.890 | 0.240 | 0.650 |
| Fe | 0.770 | 0.220 | 0.790 |
| Pb | 0.790 | 0.300 | 0.740 |
| Mg, AsCaCO₃ | 7.23 | 7.06 | 6.26 |
| Mn | 1.22 | 0.650 | 1.02 |
| Mo, AsMoO₄ | 3.12 | 3.01 | 2.97 |
| Ni | 0.860 | 0.340 | 0.800 |
| Se | 1.40 | 1.21 | 0.189 |
| Ag | 0.220 | 0.06000 | 0.01000 |
| Sr | 1.70 | 1.58 | 1.39 |
| Ti | 0.680 | 0.190 | 0.670 |
| V | 0.880 | 0.500 | 0.960 |
| Zn | 0.740 | 0.250 | 0.850 |
| Zr | 0.850 | 0.390 | 0.850 |

| Sample 2 | Composition 3 2 ppm | Composition 3 20 ppm | Composition 3 100 ppm |
|---|---|---|---|
| Al | 1.00 | 0.800 | 1.20 |
| Sb | <0.05000 | <0.5000 | <0.05000 |
| As | 0.700 | 0.400 | 1.00 |
| Cd | 0.360 | 0.100 | 0.600 |
| Ca, AsCaCO₃ | 0.140 | 0.05000 | 0.06000 |
| Cr, AsCrO₄ | 0.880 | 0.210 | 1.50 |
| Co | 0.430 | 0.120 | 0.530 |
| Cu | 0.770 | 0.490 | 0.830 |
| Fe | 0.01000 | <0.00300 | 0.00400 |
| Pb | 0.420 | 0.09000 | 0.730 |
| Mg, AsCaCO₃ | 7.06 | 6.45 | 6.22 |
| Mn | <0.00100 | <0.00100 | <0.00100 |
| Mo, AsMoO₄ | 2.61 | 2.38 | 2.89 |
| Ni | 0.460 | 0.200 | 0.790 |
| Se | 1.00 | 1.00 | 1.00 |
| Ag | 0.240 | 0.003000 | 0.01000 |
| Sr | 1.71 | 1.53 | 1.42 |
| Ti | 0.420 | 0.100 | 0.700 |
| V | 0.620 | 0.370 | 1.11 |
| Zn | 0.480 | 0.170 | 0.840 |
| Tl | 2.00 | 1.00 | 2.00 |

| Sample 2 | Composition 4 2 ppm | Composition 4 20 ppm | Composition 4 100 ppm |
|---|---|---|---|
| Al | 1.90 | 0.800 | 1.10 |
| Sb | <0.05000 | <0.05000 | <0.05000 |
| As | 2.00 | 0.500 | 0.900 |
| Cd | 1.36 | 0.190 | 0.490 |
| Ca, AsCaCO₃ | 0.09000 | 0.07000 | 0.330 |
| Cr, AsCrO₄ | 3.42 | 0.480 | 1.20 |
| Co | 1.60 | 0.230 | 0.510 |
| Cu | 1.70 | 0.510 | 0.590 |
| Fe | <0.00300 | <0.00300 | 0.01000 |
| Pb | 1.70 | 0.200 | 0.590 |
| Mg, AsCaCO₃ | 7.61 | 6.55 | 5.69 |
| Mn | <0.00100 | <0.00100 | <0.00100 |
| Mo, AsMoO₄ | 3.22 | 2.40 | 2.52 |
| Ni | 1.70 | 0.300 | 0.610 |
| Se | 2.00 | 1.00 | 1.00 |
| Ag | 0.380 | 0.07000 | 0.05000 |
| Sr | 1.90 | 1.56 | 1.30 |
| Ti | 1.60 | 0.200 | 0.560 |
| V | 1.67 | 0.490 | 0.910 |
| Zn | 1.66 | 0.270 | 0.680 |
| Tl | 2.00 | 1.00 | 1.00 |

| Sample 2 | Composition 5 2 ppm | Composition 5 20 ppm | Composition 5 100 ppm |
|---|---|---|---|
| Al | 1.40 | 0.900 | 1.70 |
| Sb | <0.05000 | <0.05000 | <0.05000 |
| As | 1.00 | 0.700 | 2.00 |
| Cd | 0.920 | 0.260 | 1.30 |
| Ca, AsCaCO₃ | 0.110 | 0.160 | 0.120 |
| Cr, AsCrO₄ | 2.36 | 0.640 | 3.33 |
| Co | 1.08 | 0.310 | 1.25 |
| Cu | 1.24 | 0.560 | 1.58 |
| Fe | 0.01000 | 0.03000 | <0.00300 |
| Pb | 1.10 | 0.300 | 1.60 |
| Mg, AsCaCO₃ | 6.33 | 6.52 | 6.74 |
| Mn | <0.00100 | <0.00100 | <0.00100 |
| Mo, AsMoO₄ | 2.82 | 2.93 | 3.08 |
| Ni | 1.20 | 0.340 | 1.60 |
| Se | 2.00 | 2.00 | 1.00 |
| Ag | 0.300 | 0.08000 | 0.03000 |
| Sr | 1.59 | 1.56 | 1.69 |
| Ti | 1.10 | 0.300 | 1.55 |
| V | 1.24 | 0.700 | 1.68 |
| Zn | 1.13 | 0.350 | 1.63 |
| Zr | 2.00 | 1.00 | 2.00 |

| Sample 2 | Composition 6 2 ppm | Composition 6 20 ppm | Composition 6 100 ppm |
|---|---|---|---|
| Al | 2.00 | 0.900 | 1.60 |
| Sb | <0.05000 | <0.05000 | <0.05000 |
| As | 2.00 | 0.700 | 1.00 |
| Cd | 1.56 | 0.220 | 1.07 |
| Ca, AsCaCO₃ | 0.250 | 0.09000 | 0.250 |
| Cr, AsCrO₄ | 3.95 | 0.560 | 2.74 |
| Co | 1.82 | 0.270 | 1.12 |
| Cu | 1.90 | 0.460 | 1.05 |
| Fe | <0.003000 | 0.01000 | <0.00300 |
| Pb | 1.90 | 0.300 | 1.30 |
| Mg, AsCaCO₃ | 7.95 | 6.16 | 6.43 |
| Mn | <0.00100 | <0.00100 | <0.00100 |
| Mo, AsMoO₄ | 3.37 | 2.80 | 2.96 |
| Ni | 1.90 | 0.310 | 1.30 |
| Se | 2.00 | 2.00 | 1.00 |
| Ag | 0.420 | 0.08000 | 0.08000 |
| Sr | 2.00 | 1.55 | 1.60 |
| Ti | 1.80 | 0.250 | 1.25 |
| V | 1.89 | 0.640 | 1.49 |
| Zn | 1.88 | 0.330 | 1.35 |
| Tl | 2.10 | 1.00 | 2.00 |

| Sample 2 | E-2863 2 ppm | E-2863 20 ppm | E-2863 100 ppm |
|---|---|---|---|
| Al | 1.00 | 0.900 | 1.50 |
| Sb | <0.05000 | <0.05000 | <0.05000 |

TABLE IVA-continued

Synthetic Wastewater - Unfiltered Supernatant Analysis

| | | | |
|---|---|---|---|
| As | 0.800 | 0.800 | 1.00 |
| Cd | 0.460 | 0.280 | 1.06 |
| Ca, AsCaCO₃ | 0.140 | 0.05000 | 0.130 |
| Cr, AsCrO₄ | 1.20 | 0.690 | 2.65 |
| Co | 0.500 | 0.340 | 1.17 |
| Cu | 0.950 | 0.550 | 1.21 |
| Fe | 0.00400 | <0.00300 | <0.00300 |
| Pb | 0.550 | 0.300 | 1.30 |
| Mg, AsCaCO₃ | 6.92 | 6.43 | 6.61 |
| Mn | <0.00100 | <0.00100 | <0.00100 |
| Mo, AsMoO₄ | 2.67 | 2.81 | 2.99 |
| Ni | 0.590 | 0.390 | 1.30 |
| Se | 1.00 | 1.00 | 0.100 |
| Ag | 0.200 | 0.100 | 0.100 |
| Sr | 1.67 | 1.39 | 1.55 |
| Ti | 0.540 | 0.320 | 1.23 |
| V | 0.740 | 0.750 | 1.52 |
| Zn | 0.590 | 0.390 | 1.32 |
| Tl | 2.00 | 0.900 | 1.00 |

TABLE IVA

Synthetic Wastewater - Unfiltered Supernatant Analysis

| Sample 1 | DMDTC 2 ppm | DMDTC 20 ppm | DMDTC 100 ppm |
|---|---|---|---|
| Al | 1.60 | 0.500 | 0.900 |
| Sb | 2.30 | 1.00 | 2.00 |
| As | 1.44 | 0.266 | 0.571 |
| Cd | 1.41 | 0.150 | 0.310 |
| Ca, AsCaCO₃ | 5.16 | 4.51 | 4.32 |
| Cr, AsCrO₄ | 3.18 | 0.330 | 1.10 |
| Co | 1.49 | 0.370 | 0.160 |
| Cu | 1.49 | 0.190 | 0.400 |
| Fe | 1.66 | 0.160 | 0.550 |
| Pb | 1.50 | 0.200 | 0.500 |
| Mg, AsCaCO₃ | 7.41 | 6.92 | 6.59 |
| Mn | 1.66 | 0.780 | 0.890 |
| Mo, AsMoO₄ | 3.43 | 2.98 | 3.08 |
| Ni | 1.50 | 0.300 | 0.450 |
| Se | 1.69 | 1.10 | 0.259 |
| Ag | 0.330 | 0.04000 | 0.08000 |
| Sr | 1.79 | 1.53 | 1.46 |
| Ti | 1.48 | 0.120 | 0.440 |
| V | 1.52 | 0.520 | 0.780 |
| Zn | 1.50 | 0.230 | 0.700 |
| Zr | 1.52 | 0.440 | 0.710 |

| Sample 1 | Composition 1 2 ppm | Composition 1 20 ppm | Composition 1 100 ppm |
|---|---|---|---|
| Al | 0.600 | 0.300 | 1.70 |
| Sb | 2.00 | 1.00 | 2.40 |
| As | 0.535 | 0.266 | 1.61 |
| Cd | 0.490 | 0.120 | 1.62 |
| Ca, AsCaCO₃ | 4.44 | 4.06 | 4.62 |
| Cr, AsCrO₄ | 0.300 | 0.220 | 3.47 |
| Co | 0.620 | 0.150 | 0.660 |
| Cu | 0.680 | 0.140 | 0.890 |
| Fe | 0.490 | 0.110 | 1.86 |
| Pb | 0.580 | 0.200 | 1.70 |
| Mg, AsCaCO₃ | 7.15 | 6.85 | 7.03 |
| Mn | 1.09 | 0.560 | 1.65 |
| Mo, AsMoO₄ | 3.07 | 2.93 | 3.22 |
| Ni | 0.670 | 0.200 | 1.60 |
| Se | 1.30 | 1.18 | 0.06000 |
| Ag | 0.200 | 0.03000 | <0.00500 |
| Sr | 1.67 | 1.52 | 1.72 |
| Ti | 0.430 | 0.100 | 1.67 |
| V | 0.680 | 0.440 | 1.62 |
| Zn | 0.500 | 0.160 | 1.71 |
| Zr | 0.660 | 0.390 | 1.64 |

TABLE IVA-continued

Synthetic Wastewater - Unfiltered Supernatant Analysis

| Sample 1 | Composition 2 2 ppm | Composition 2 20 ppm | Composition 2 100 ppm |
|---|---|---|---|
| Al | 0.800 | 0.400 | 1.00 |
| Sb | 2.00 | 1.00 | 2.00 |
| As | 0.761 | 0.340 | 0.811 |
| Cd | 0.730 | 0.210 | 0.700 |
| Ca, AsCaCO₃ | 4.51 | 4.26 | 3.68 |
| Cr, AsCrO₄ | 1.50 | 0.410 | 1.50 |
| Co | 0.810 | 0.260 | 0.380 |
| Cu | 0.890 | 0.240 | 0.650 |
| Fe | 0.770 | 0.220 | 0.790 |
| Pb | 0.790 | 0.300 | 0.740 |
| Mg, AsCaCO₃ | 7.23 | 7.06 | 6.26 |
| Mn | 1.22 | 0.650 | 1.02 |
| Mo, AsMoO₄ | 3.12 | 3.01 | 2.97 |
| Ni | 0.860 | 0.340 | 0.800 |
| Se | 1.40 | 1.21 | 0.189 |
| Ag | 0.220 | 0.06000 | 0.01000 |
| Sr | 1.70 | 1.58 | 1.39 |
| Ti | 0.680 | 0.190 | 0.670 |
| V | 0.880 | 0.500 | 0.960 |
| Zn | 0.740 | 0.250 | 0.850 |
| Zr | 0.850 | 0.390 | 0.850 |

| Sample 2 | Composition 3 2 ppm | Composition 3 20 ppm | Composition 3 100 ppm |
|---|---|---|---|
| Al | 1.00 | 0.800 | 1.20 |
| Sb | <0.05000 | <0.5000 | <0.05000 |
| As | 0.700 | 0.400 | 1.00 |
| Cd | 0.360 | 0.100 | 0.600 |
| Ca, AsCaCO₃ | 0.140 | 0.05000 | 0.06000 |
| Cr, AsCrO₄ | 0.880 | 0.210 | 1.50 |
| Co | 0.430 | 0.120 | 0.530 |
| Cu | 0.770 | 0.490 | 0.830 |
| Fe | 0.01000 | <0.00300 | 0.00400 |
| Pb | 0.420 | 0.09000 | 0.730 |
| Mg, AsCaCO₃ | 7.06 | 6.45 | 6.22 |
| Mn | <0.00100 | <0.00100 | <0.00100 |
| Mo, AsMoO₄ | 2.61 | 2.38 | 2.89 |
| Ni | 0.460 | 0.200 | 0.790 |
| Se | 1.00 | 1.00 | 1.00 |
| Ag | 0.240 | 0.003000 | 0.01000 |
| Sr | 1.71 | 1.53 | 1.42 |
| Ti | 0.420 | 0.100 | 0.700 |
| V | 0.620 | 0.370 | 1.11 |
| Zn | 0.480 | 0.170 | 0.840 |
| Tl | 2.00 | 1.00 | 2.00 |

| Sample 2 | Composition 4 2 ppm | Composition 4 20 ppm | Composition 4 100 ppm |
|---|---|---|---|
| Al | 1.90 | 0.800 | 1.10 |
| Sb | <0.05000 | <0.05000 | <0.05000 |
| As | 2.00 | 0.500 | 0.900 |
| Cd | 1.36 | 0.190 | 0.490 |
| Ca, AsCaCO₃ | 0.09000 | 0.07000 | 0.330 |
| Cr, AsCrO₄ | 3.42 | 0.480 | 1.20 |
| Co | 1.60 | 0.230 | 0.510 |
| Cu | 1.70 | 0.510 | 0.590 |
| Fe | <0.00300 | <0.00300 | 0.01000 |
| Pb | 1.70 | 0.200 | 0.590 |
| Mg, AsCaCO₃ | 7.61 | 6.55 | 5.69 |
| Mn | <0.00100 | <0.00100 | <0.00100 |
| Mo, AsMoO₄ | 3.22 | 2.40 | 2.52 |
| Ni | 1.70 | 0.300 | 0.610 |
| Se | 2.00 | 1.00 | 1.00 |
| Ag | 0.380 | 0.07000 | 0.05000 |
| Sr | 1.90 | 1.56 | 1.30 |
| Ti | 1.60 | 0.200 | 0.560 |
| V | 1.67 | 0.490 | 0.910 |
| Zn | 1.66 | 0.270 | 0.680 |
| Tl | 2.00 | 1.00 | 1.00 |

TABLE IVA-continued

Synthetic Wastewater - Unfiltered Supernatant Analysis

| Sample 2 | Composition 5 2 ppm | Composition 5 20 ppm | Composition 5 100 ppm |
|---|---|---|---|
| Al | 1.40 | 0.900 | 1.70 |
| Sb | <0.05000 | <0.05000 | <0.05000 |
| As | 1.00 | 0.700 | 2.00 |
| Cd | 0.920 | 0.260 | 1.30 |
| Ca, AsCaCO$_3$ | 0.110 | 0.160 | 0.120 |
| Cr, AsCrO$_4$ | 2.36 | 0.640 | 3.33 |
| Co | 1.08 | 0.310 | 1.25 |
| Cu | 1.24 | 0.560 | 1.58 |
| Fe | 0.01000 | 0.03000 | <0.00300 |
| Pb | 1.10 | 0.300 | 1.60 |
| Mg, AsCaCO$_3$ | 6.33 | 6.52 | 6.74 |
| Mn | <0.00100 | <0.00100 | <0.00100 |
| Mo, AsMoO$_4$ | 2.82 | 2.93 | 3.08 |
| Ni | 1.20 | 0.340 | 1.60 |
| Se | 2.00 | 2.00 | 1.00 |
| Ag | 0.300 | 0.08000 | 0.03000 |
| Sr | 1.59 | 1.56 | 1.69 |
| Ti | 1.10 | 0.300 | 1.55 |
| V | 1.24 | 0.700 | 1.68 |
| Zn | 1.13 | 0.350 | 1.63 |
| Zr | 2.00 | 1.00 | 2.00 |

| Sample 2 | Composition 6 2 ppm | Composition 6 20 ppm | Composition 6 100 ppm |
|---|---|---|---|
| Al | 2.00 | 0.900 | 1.60 |
| Sb | <0.05000 | <0.05000 | <0.05000 |
| As | 2.00 | 0.700 | 1.00 |
| Cd | 1.56 | 0.220 | 1.07 |
| Ca, AsCaCO$_3$ | 0.250 | 0.09000 | 0.250 |
| Cr, AsCrO$_4$ | 3.95 | 0.560 | 2.74 |
| Co | 1.82 | 0.270 | 1.12 |
| Cu | 1.90 | 0.460 | 1.05 |
| Fe | <0.003000 | 0.01000 | <0.00300 |
| Pb | 1.90 | 0.300 | 1.30 |
| Mg, AsCaCO$_3$ | 7.95 | 6.16 | 6.43 |
| Mn | <0.00100 | <0.00100 | <0.00100 |
| Mo, AsMoO$_4$ | 3.37 | 2.80 | 2.96 |
| Ni | 1.90 | 0.310 | 1.30 |
| Se | 2.00 | 2.00 | 1.00 |
| Ag | 0.420 | 0.08000 | 0.08000 |
| Sr | 2.00 | 1.55 | 1.60 |
| Ti | 1.80 | 0.250 | 1.25 |
| V | 1.89 | 0.640 | 1.49 |
| Zn | 1.88 | 0.330 | 1.35 |
| Tl | 2.10 | 1.00 | 2.00 |

| Sample 2 | E-2863 2 ppm | E-2863 20 ppm | E-2863 100 ppm |
|---|---|---|---|
| Al | 1.00 | 0.900 | 1.50 |
| Sb | <0.05000 | <0.05000 | <0.05000 |
| As | 0.800 | 0.800 | 1.00 |
| Cd | 0.460 | 0.280 | 1.06 |
| Ca, AsCaCO$_3$ | 0.140 | 0.05000 | 0.130 |
| Cr, AsCrO$_4$ | 1.20 | 0.690 | 2.65 |
| Co | 0.500 | 0.340 | 1.17 |
| Cu | 0.950 | 0.550 | 1.21 |
| Fe | 0.00400 | <0.00300 | <0.00300 |
| Pb | 0.550 | 0.300 | 1.30 |
| Mg, AsCaCO$_3$ | 6.92 | 6.43 | 6.61 |
| Mn | <0.00100 | <0.00100 | <0.00100 |
| Mo, AsMoO$_4$ | 2.67 | 2.81 | 2.99 |
| Ni | 0.590 | 0.390 | 1.30 |
| Se | 1.00 | 1.00 | 0.100 |
| Ag | 0.200 | 0.100 | 0.100 |
| Sr | 1.67 | 1.39 | 1.55 |
| Ti | 0.540 | 0.320 | 1.23 |
| V | 0.740 | 0.750 | 1.52 |
| Zn | 0.590 | 0.390 | 1.32 |
| Tl | 2.00 | 0.900 | 1.00 |

Results of the analysis for Al in Sample 2, filtered supernatant, treated with compositions 3–6 were not reported due to a test error which occurred during the analysis for that element.

The data in Tables IVA and IVB show that metal ions such as Cu, Pb, and Zn, and non-metal ions such as As, are removed by the water soluble polymeric dithiocarbamic acid salts described in this invention. Also shown is that the invention polymeric dithiocarbamic acid salts do not remove significant amounts of non-toxic metals Ca and Mg. The selectivity of the polymers of this invention for non-alkaline earth and non-alkali metal ions is advantageous because the presence of IA and IIA ions will not increase the dosage needed to precipitate the toxic transition and post transition metals. For most of the treatments, the floc formed by the polymers of this invention were large and settled faster than those formed with DMDTC and E-2863. Tests run on unfiltered and filtered sample I treated with 5, 10 and 50 ppm of DMDTC, composition I and composition 2 and run on unfiltered and filtered sample 2 treated with 5, 10 and 50 ppm of composition 3, composition 4, composition 5, composition 6 and E-2863 produced results similar to those disclosed in Tables IVA and IVB.

EXAMPLE 4

The compositions set forth in Table II were evaluated in two samples of a wastewater from a hazardous waste incinerator facility containing a variety of metal and non-metal ions with varying dosages utilizing the procedure described in Example 3. The initial water analyses for the two samples at pH 9.0 are shown in Table VA.

TABLE VA

Hazardous Waste Incinerator Water Analysis

| Metal | Sample 1 (ppm) | Sample 2 (ppm) | Metal | Sample 1 (ppm) | Sample 2 (ppm) |
|---|---|---|---|---|---|
| Al | 0.17 | 2.00 | Mg as CaCO$_3$ | 10.30 | 7.90 |
| Sb | 0.14 | 0.60 | Mn | 0.19 | 0.08 |
| As | <0.05 | 0.36 | Mo as MoO$_4$ | 0.30 | 0.92 |
| Ba | 0.01 | 0.01 | Ni | 0.04 | 0.03 |
| B | 1.30 | 2.50 | Se | <0.05 | 0.06 |
| Cd | <0.01 | 0.01 | Ag | 0.01 | 0.03 |
| Ca, as CaCO$_3$ | 54.1 | 5.96 | Sr | 0.15 | 0.02 |
|  |  |  | Hg | 0.019 | 0 |
| Cr, as CrO$_4$ | <0.01 | 0.04 | Sn | <0.01 | 0.20 |
| Co | 0.01 | 0.02 | Ti | 0.01 | 0.10 |
| Cu | 0.03 | 0.08 | V | <0.01 | 0.03 |
| Fe | 5.36 | 13.50 | Zn | 0.16 | 0.31 |
| Pb | <0.02 | 0.05 | Zr | 0.17 | 0.04 | where < indicates the metal concentration was below the ICP-AES detection limit.

The unfiltered supernatant was analyzed for metal content using ICP-AES. The results are shown in Table VB.

TABLE VB

Hazardous Waste Incinerator Scrubber Water

Sample 1

| Metal | Treatment (ppm) | Average Untreated Concentration (ppm) | Supernatant Concentration in ppm | | |
|---|---|---|---|---|---|
| | | | | Composition | |
| | | | DMDTC | 1 | 2 |
| B | 0.0 | 1.30 | 1.30 | 1.30 | 1.30 |
| | 2.5 | | 1.15 | 1.30 | 1.16 |
| | 5.0 | | 1.25 | 1.10 | 1.11 |
| | 10.0 | | 1.32 | 1.20 | 1.20 |
| | 15.0 | | 1.13 | 1.20 | 1.19 |
| | 20.0 | | 1.14 | 1.10 | 1.11 |
| | 25.0 | | 1.21 | 1.20 | 1.23 |
| Ca | 0.0 | 54.10 | 54.10 | 54.10 | 54.10 |
| | 2.5 | | 47.10 | 55.20 | 48.30 |
| | 5.0 | | 52.10 | 46.40 | 46.20 |
| | 10.0 | | 54.50 | 50.50 | 50.70 |
| | 15.0 | | 46.60 | 50.00 | 48.80 |
| | 20.0 | | 46.10 | 46.80 | 45.90 |
| | 25.0 | | 50.40 | 48.80 | 50.90 |
| Cu | 0.0 | 0.03 | 0.03 | 0.03 | 0.03 |
| | 2.5 | | 0.03 | <0.01 | <0.01 |
| | 5.0 | | 0.01 | <0.01 | <0.01 |
| | 10.0 | | <0.01 | <0.01 | <0.01 |
| | 15.0 | | <0.01 | <0.01 | <0.01 |
| | 20.0 | | <0.01 | 0.01 | <0.01 |
| | 25.0 | | <0.01 | <0.01 | <0.01 |
| Fe | 0.0 | 5.36 | 5.36 | 5.36 | 5.36 |
| | 2.5 | | 5.65 | 3.11 | 2.25 |
| | 5.0 | | 4.66 | 2.43 | 2.48 |
| | 10.0 | | 5.25 | 3.85 | 3.26 |
| | 15.0 | | 5.20 | 4.03 | 3.09 |
| | 20.0 | | 5.92 | 4.38 | 2.70 |
| | 25.0 | | 5.45 | 4.66 | 4.14 |
| Mg | 0.0 | 10.30 | 10.30 | 10.30 | 10.30 |
| | 2.5 | | 9.16 | 10.50 | 9.35 |
| | 5.0 | | 9.94 | 8.87 | 8.96 |
| | 10.0 | | 10.40 | 9.59 | 9.68 |
| | 15.0 | | 8.98 | 9.49 | 9.41 |
| | 20.0 | | 9.00 | 8.93 | 8.87 |
| | 25.0 | | 9.67 | 9.34 | 9.73 |
| Mn | 0.0 | 0.19 | 0.19 | 0.19 | 0.19 |
| | 2.5 | | 0.18 | 0.24 | 0.21 |
| | 5.0 | | 0.19 | 0.19 | 0.20 |
| | 10.0 | | 0.19 | 0.22 | 0.22 |
| | 15.0 | | 0.17 | 0.21 | 0.21 |
| | 20.0 | | 0.17 | 0.20 | 0.20 |
| | 25.0 | | 0.18 | 0.21 | 0.20 |
| Mo | 0.0 | 0.30 | 0.30 | 0.30 | 0.30 |
| | 2.5 | | 0.21 | 0.29 | 0.30 |
| | 5.0 | | 0.29 | 0.27 | 0.26 |
| | 10.0 | | 0.28 | 0.22 | 0.24 |
| | 15.0 | | 0.23 | 0.20 | 0.25 |
| | 20.0 | | 0.26 | 0.21 | 0.22 |
| | 25.0 | | 0.29 | 0.23 | 0.25 |
| Sb | 0.0 | 0.14 | 0.14 | 0.14 | 0.14 |
| | 2.5 | | 0.11 | 0.20 | 0.15 |
| | 5.0 | | 0.15 | 0.10 | 0.10 |
| | 10.0 | | 0.12 | 0.10 | 0.13 |
| | 15.0 | | 0.11 | 0.20 | 0.14 |
| | 20.0 | | 0.13 | 0.20 | 0.12 |
| | 25.0 | | 0.13 | 0.10 | 0.14 |
| Sr | 0.0 | 0.15 | 0.15 | 0.15 | 0.15 |
| | 2.5 | | 0.13 | 0.15 | 0.13 |
| | 5.0 | | 0.14 | 0.13 | 0.13 |
| | 10.0 | | 0.15 | 0.14 | 0.14 |
| | 15.0 | | 0.13 | 0.14 | 0.13 |
| | 20.0 | | 0.13 | 0.13 | 0.12 |
| | 25.0 | | 0.14 | 0.13 | 0.14 |
| Zn | 0.0 | 0.16 | 0.16 | 0.16 | 0.16 |
| | 2.5 | | 0.15 | 0.12 | 0.12 |
| | 5.0 | | 0.16 | 0.09 | 0.11 |
| | 10.0 | | 0.15 | 0.07 | 0.07 |
| | 15.0 | | 0.19 | 0.07 | 0.06 |

TABLE VB-continued

Hazardous Waste Incinerator Scrubber Water

|   |      |       |       |       |       |
|---|------|-------|-------|-------|-------|
|   | 20.0 |       | 0.17  | 0.07  | 0.06  |
|   | 25.0 |       | 0.16  | 0.06  | 0.06  |
| Zr | 0.0 | 0.17  | 0.17  | 0.17  | 0.17  |
|   | 2.5  |       | <0.01 | <0.01 | <0.01 |
|   | 5.0  |       | 0.02  | <0.01 | <0.01 |
|   | 10.0 |       | <0.01 | <0.01 | <0.01 |
|   | 15.0 |       | <0.01 | <0.01 | <0.01 |
|   | 20.0 |       | 0.01  | <0.01 | <0.01 |
|   | 25.0 |       | 0.01  | <0.01 | <0.01 |
| Hg | 0.0 | 0.019 | 0.019 | 0.019 | 0.019 |
|   | 2.5  |       | 0.011 | 0.004 | <0.001 |
|   | 5.0  |       | 0.004 | <0.001 | <0.001 |
|   | 10.0 |       | 0.006 | <0.001 | 0.005 |
|   | 15.0 |       | 0.006 | <0.001 | <0.001 |
|   | 20.0 |       | 0.004 | 0.003 | <0.001 |
|   | 25.0 |       | 0.003 | <0.001 | 0.001 |

Sample 2

| Metal | Treatment Concentration (ppm) | Average Untreated Concentration (ppm) | DMDTC | 3 | 4 | 5 | 6 |
|-------|---|---|---|---|---|---|---|
| Ag | 0  | 0.03 | 0.03 | 0.03  | 0.03  | 0.03 | 0.03 |
|    | 5  |      | 0.01 | 0.01  | <0.01 | 0.01 | 0.01 |
|    | 10 |      | 0.02 | 0.01  | 0.01  | 0.01 | <0.01 |
|    | 20 |      | 0.01 | <0.01 | <0.01 | 0.01 | <0.01 |
|    | 50 |      | 0.02 | <0.01 | <0.01 | 0.01 | <0.01 |
| Al | 0  | 2.00 | 2.00 | 2.00 | 2.00 | 2.00 | 2.00 |
|    | 5  |      | 2.00 | 2.10 | 2.10 | 2.10 | 1.90 |
|    | 10 |      | 2.00 | 2.00 | 2.00 | 2.00 | 1.90 |
|    | 20 |      | 2.00 | 2.00 | 2.00 | 1.90 | 1.90 |
|    | 50 |      | 2.00 | 2.00 | 1.90 | 1.90 | 1.90 |
| As | 0  | 0.36 | 0.36 | 0.36 | 0.36 | 0.36 | 0.36 |
|    | 5  |      | 0.35 | 0.34 | 0.32 | 0.34 | 0.32 |
|    | 10 |      | 0.32 | 0.34 | 0.35 | 0.31 | 0.30 |
|    | 20 |      | 0.32 | 0.32 | 0.31 | 0.31 | 0.30 |
|    | 50 |      | 0.30 | 0.33 | 0.30 | 0.33 | 0.33 |
| B  | 0  | 2.50 | 2.50 | 2.50 | 2.50 | 2.50 | 2.50 |
|    | 5  |      | 2.40 | 2.50 | 2.60 | 2.50 | 2.40 |
|    | 10 |      | 2.50 | 2.50 | 2.50 | 2.50 | 2.40 |
|    | 20 |      | 2.50 | 2.50 | 2.50 | 2.40 | 2.40 |
|    | 50 |      | 2.50 | 2.50 | 2.40 | 2.40 | 2.40 |
| Ca | 0  | 5.96 | 5.96 | 5.96 | 5.96 | 5.96 | 5.96 |
|    | 5  |      | 5.68 | 6.02 | 5.85 | 6.05 | 5.63 |
|    | 10 |      | 5.78 | 5.71 | 5.65 | 5.76 | 5.45 |
|    | 20 |      | 5.69 | 5.70 | 5.86 | 5.55 | 5.48 |
|    | 50 |      | 5.77 | 5.72 | 5.46 | 5.54 | 5.49 |
| Cu | 0  | 0.08 | 0.08 | 0.08 | 0.08 | 0.08 | 0.08 |
|    | 5  |      | 0.04 | 0.17 | 0.05 | 0.06 | 0.04 |
|    | 10 |      | 0.49 | 0.23 | 0.03 | 0.03 | 0.01 |
|    | 20 |      | 0.03 | 0.22 | 0.02 | 0.02 | <0.01 |
|    | 50 |      | 0.23 | 0.25 | <0.01 | 0.02 | <0.01 |
| Fe | 0  | 13.50 | 13.50 | 13.50 | 13.50 | 13.50 | 13.50 |
|    | 5  |      | 10.90 | 11.70 | 12.40 | 12.00 | 11.00 |
|    | 10 |      | 11.70 | 11.00 | 10.90 | 11.00 | 10.10 |
|    | 20 |      | 11.10 | 12.10 | 11.00 | 11.40 | 9.95 |
|    | 50 |      | 11.80 | 12.20 | 10.10 | 11.40 | 10.60 |
| Mg | 0  | 7.90 | 7.90 | 7.90 | 7.90 | 7.90 | 7.90 |
|    | 5  |      | 7.72 | 8.15 | 8.16 | 8.02 | 7.57 |
|    | 10 |      | 7.84 | 8.01 | 7.95 | 7.74 | 7.45 |
|    | 20 |      | 7.72 | 7.96 | 8.12 | 7.59 | 7.57 |
|    | 50 |      | 7.76 | 7.93 | 7.72 | 7.53 | 7.58 |
| Mn | 0  | 0.08 | 0.08 | 0.08 | 0.08 | 0.08 | 0.08 |
|    | 5  |      | 0.08 | 0.10 | 0.09 | 0.09 | 0.08 |
|    | 10 |      | 0.10 | 0.09 | 0.09 | 0.08 | 0.07 |
|    | 20 |      | 0.08 | 0.10 | 0.08 | 0.08 | 0.07 |
|    | 50 |      | 0.10 | 0.10 | 0.07 | 0.07 | 0.08 |
| Mo | 0  | 0.92 | 0.92 | 0.92 | 0.92 | 0.92 | 0.92 |
|    | 5  |      | 0.84 | 0.88 | 0.87 | 0.87 | 0.81 |
|    | 10 |      | 0.86 | 0.79 | 0.80 | 0.79 | 0.74 |
|    | 20 |      | 0.84 | 0.57 | 0.73 | 0.62 | 0.68 |
|    | 50 |      | 0.82 | 0.26 | 0.35 | 0.32 | 0.42 |
| Sb | 0  | 0.60 | 0.60 | 0.60 | 0.60 | 0.60 | 0.60 |
|    | 5  |      | 0.40 | 0.40 | 0.40 | 0.40 | 0.30 |
|    | 10 |      | 0.30 | 0.40 | 0.30 | 0.40 | 0.30 |

TABLE VB-continued

Hazardous Waste Incinerator Scrubber Water

|    |    |      |       |       |       |       |       |
|----|----|------|-------|-------|-------|-------|-------|
|    | 20 |      | 0.30  | 0.30  | 0.40  | 0.30  | 0.30  |
|    | 50 |      | 0.30  | 0.30  | 0.30  | 0.30  | 0.60  |
| Sn | 0  | 0.20 | 0.20  | 0.20  | 0.20  | 0.20  | 0.20  |
|    | 5  |      | 0.10  | 0.20  | 0.20  | 0.10  | 0.10  |
|    | 10 |      | 0.10  | 0.20  | 0.20  | 0.20  | 0.10  |
|    | 20 |      | 0.10  | 0.20  | 0.20  | 0.20  | 0.20  |
|    | 50 |      | 0.10  | 0.20  | 0.20  | 0.20  | 0.10  |
| Ti | 0  | 0.10 | 0.10  | 0.10  | 0.10  | 0.10  | 0.10  |
|    | 5  |      | 0.06  | 0.08  | 0.05  | 0.07  | 0.06  |
|    | 10 |      | 0.05  | 0.05  | 0.05  | 0.05  | 0.04  |
|    | 20 |      | 0.05  | 0.05  | 0.05  | 0.06  | 0.03  |
|    | 50 |      | 0.05  | 0.04  | 0.03  | 0.05  | 0.02  |
| V  | 0  | 0.03 | 0.03  | 0.03  | 0.03  | 0.03  | 0.03  |
|    | 5  |      | 0.02  | 0.04  | 0.02  | 0.04  | 0.03  |
|    | 10 |      | 0.02  | 0.02  | 0.02  | 0.02  | 0.02  |
|    | 20 |      | 0.02  | 0.01  | 0.02  | 0.02  | 0.01  |
|    | 50 |      | 0.02  | <0.01 | <0.01 | 0.01  | <0.01 |
| Zn | 0  | 0.31 | 0.31  | 0.31  | 0.31  | 0.31  | 0.31  |
|    | 5  |      | 0.27  | 0.29  | 0.29  | 0.30  | 0.28  |
|    | 10 |      | 0.28  | 0.16  | 0.17  | 0.15  | 0.14  |
|    | 20 |      | 0.28  | 0.11  | 0.12  | 0.11  | 0.09  |
|    | 50 |      | 0.28  | 0.07  | 0.06  | 0.08  | 0.05  |
| Zr | 0  | 0.04 | 0.04  | 0.04  | 0.04  | 0.04  | 0.04  |
|    | 5  |      | <0.01 | 0.02  | <0.01 | 0.02  | <0.01 |
|    | 10 |      | <0.01 | <0.01 | <0.01 | <0.01 | <0.01 |
|    | 20 |      | <0.01 | <0.01 | <0.01 | <0.01 | <0.01 |
|    | 50 |      | <0.01 | <0.01 | <0.01 | <0.01 | <0.01 |

Supernatant metal concentrations shown greater than the untreated aqueous solution metal content were the result of experimental anomalies. Results for metals present in samples 1 and 2 at concentrations less than twice the ICP-AES analysis detection limit are not reported herein.

EXAMPLE 5

Figure 1:
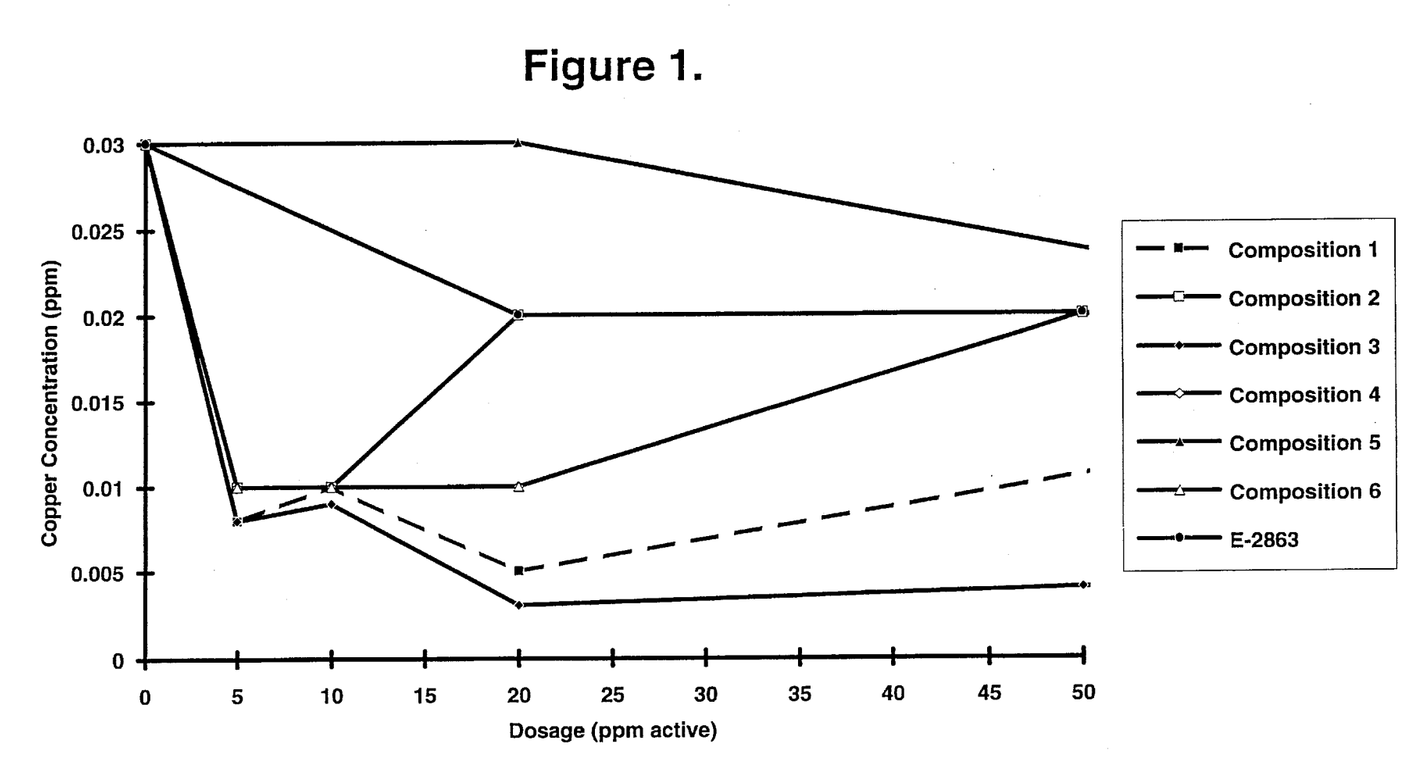
FIG. 1 is a plot of copper concentration versus dosage of metal complexing agent in cooling tower blowdown water.
Figure 2:
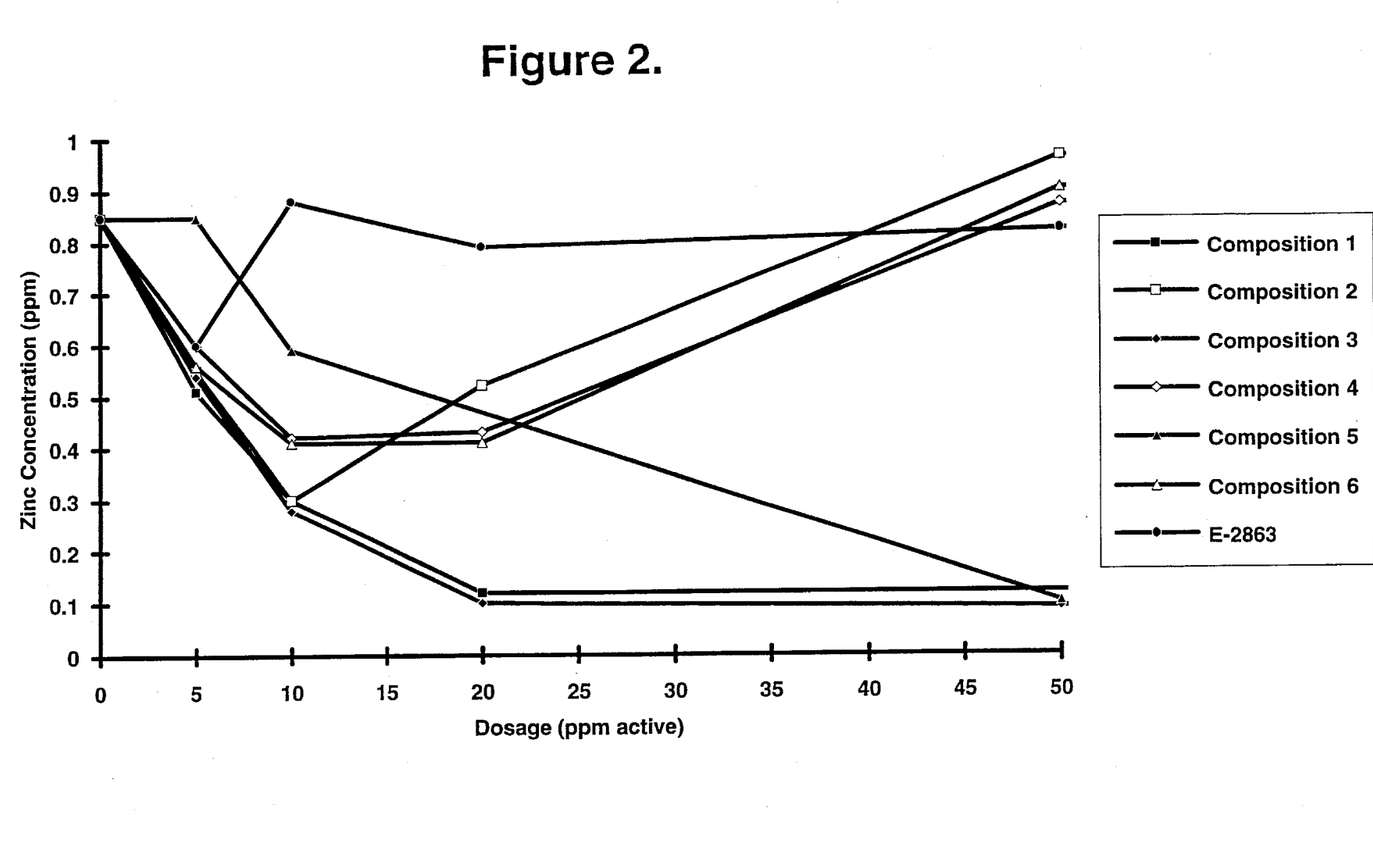
FIG. 2 is a plot of zinc concentration versus dosage of metal complexing agent in cooling tower blowdown water.

The examples set forth in Table II were evaluated in a sample of cooling tower blowdown containing metal ions and typical cooling tower treatment chemicals. The tests were conducted utilizing the procedure described in Example 3, except 150 ppm of alum and 2 ppm of cationic polymer were added in addition to the metal precipitant to remove organic species from this wastewater, and the pH of the wastewater was 8.5. The unfiltered metal removal efficiencies of the compounds of the present invention compared to CYTEC E-2863 for Cu and Zn are shown in FIGS. 1 and 2.

These figures show that the compounds of the present invention are effective in precipitating metals from cooling tower blowdown and may be used in combination with coagulants and flocculants to remove contaminants from an aqueous solution.

EXAMPLE 6

Screen bioassays for aquatic toxicity were conducted for Composition 1 compared to commercially available DMDTC and CYTEC E-2863. The results of this testing are shown in Table VI.

TABLE VI

Aquatic Toxicity Study
Cumulative % Mortality

| Compound | ppm Actives | Fathead Minnow 24 hr. | Fathead Minnow 48 hr. | Daphnia magna 24 hr. | Daphnia magna 48 hr. |
|---|---|---|---|---|---|
| Composition 1 | 0.25 | 0 | 0 | 0 | 0 |
|  | 2.50 | 0 | 0 | 0 | 0 |
|  | 25.0 | 0 | 0 | 0 | 0 |
|  | 125.0 | 95 | 95 | 100 | 100 |
|  | 250.0 | 100 | 100 | 100 | 100 |
| DMDTC | 0.04 | 100 | — | 0 | 85 |
|  | 0.20 | — | — | 50 | 100 |
|  | 0.40 | 100 | — | 100 | 100 |
|  | 2.0 | — | — | 100 | 100 |
|  | 4.0 | 100 | — | 100 | 100 |
|  | 20.0 | 100 | — | — | — |
|  | 40.0 | 100 | — | — | — |
| E-2836 | 0.029 | 0 | 0[1] | 0 | 0 |
|  | 0.29 | 0 | 0[1] | 0 | 0 |
|  | 2.90 | 40 | 40[1] | 0 | 0 |
|  | 7.25 | — | — | 80 | 95 |
|  | 14.5 | 100 | 100[1] | 100 | 100 |
|  | 29.0 | 100 | 100[1] | — | — |

[1] 96 hour test

Table VI shows that composition 1 was less toxic to the species in the study than DMDTC or E-2836.

Thus, the branched, polydithiocarbamates of the present invention form heavy, fast-settling floc which do not require filtration or addition of a coagulant/flocculant and which are not limited by water solubility or their degree of functionalization with carbon disulfide.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A method for precipitating contaminants from an aqueous solution comprising adding to said solution an amount effective for the purpose of a complexing composition comprising a water soluble, branched polydithiocarbamic acid salt having the formula:

wherein $R^1$ independently is an organic radical or:

wherein $R^4$ is independently an organic radical and x=1 to 5; at least a percentage of $R^2$ is $-CS_2R^5$ and the remainder is $-H$; $R^5$ is independently H or a cation; $R^3$ is N or a substituted organic radical; Z is independently $N-R^2$, O or S; the sum of n is an integer greater than 10; and m is an integer greater than 2 so as to complex, precipitate and remove metal contaminants from said aqueous solution, said polydithiocarbamic acid salt being formed by reaction of epihalohydrin with a mixture of an amine compound consisting of at least two primary amine functional groups and an amine compound consisting of three primary amine functional groups, then functionalization with carbon disulfide.

2. The method of claim 1 wherein in said composition $R^1$ is an ethylene radical, the sum of n is greater than 10, m is 3, $R^3$ is N, more than 50% of $R^2$ are $-CS_2R^5$, $R^5$ is an alkali metal and Z is $N-R^2$.

3. The method of claim 1 wherein in said composition $R^1$ is an ethylene radical, the sum of n is greater than 25, m is 3, $R^3$ is N, more than 50% of $R^2$ are $-CS_2R^5$, $R^5$ is an alkali metal and Z is $N-R^2$.

4. The method of claim 1 wherein in said composition $R^1$ is an ethylene radical, the sum of n is greater than 25, m is 3, $R^3$ is N, more than 79% of $R^2$ are $-CS_2R^5$, $R^5$ is an alkali metal and Z is $N-R^2$.

5. The method of claim 1 wherein said effective amount of said composition is sufficient to establish a concentration of from about 0.1 ppm to about 10,000 ppm of said composition in said aqueous solution.

6. The method of claim 1 wherein said effective amount of said composition is sufficient to establish a concentration of from about 0.1 ppm to about 1,000 ppm of said composition in said aqueous solution.

7. The method of claim 1 wherein said effective amount of said composition is sufficient to establish a concentration of from about 0.1 ppm to about 500 ppm of said composition in said aqueous solution.

8. The method of claim 1 wherein said contaminants are transition metals, post-transition metals, lanthanides, actinides, arsenic, selenium and tellurium.

9. A method for precipitating contaminants from an aqueous solution comprising
   a) adding to said solution an amount effective for the purpose of a metal complexing composition comprising a water soluble, branched polydithiocarbamic acid salt having the formula:

wherein $R^1$ independently is an organic radical or:

wherein $R^4$ is independently an organic radical and x=1 to 5; at least a percentage of $R^2$ is $-CS_2R^5$ and the remainder is $-H$; $R^5$ is independently H or a cation; $R^3$ is N or a substituted organic radical; Z is independently $N-R^2$, O or S; the sum of n is an integer greater than 10; and m is an integer greater than 2 to form metal complexes;
   b) allowing said complexes to settle from said solution as a precipitate; and
   c) separating said precipitate from said solution, said polydithiocarbamic acid salt being formed by reaction of epihalohydrin with a mixture of an amine compound consisting of at least two primary amine functional groups and an amine compound consisting of three primary amine functional groups, then functionalization with carbon disulfide.

10. The method of claim 9 further comprising adding a coagulant or a flocculant in step a).

11. The method of claim 9 wherein said aqueous solution is incinerator scrubber water, cooling tower blowdown, mining wastewater or metal finishing wastewater.

* * * * *